US007295195B2

(12) United States Patent
Nishimura

(10) Patent No.: US 7,295,195 B2
(45) Date of Patent: Nov. 13, 2007

(54) SEMICONDUCTOR INTEGRATED CIRCUIT

(75) Inventor: Motoaki Nishimura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 618 days.

(21) Appl. No.: 10/863,730

(22) Filed: Jun. 9, 2004

(65) Prior Publication Data

US 2005/0017960 A1 Jan. 27, 2005

(30) Foreign Application Priority Data

Jun. 11, 2003 (JP) ............................ 2003-166041

(51) Int. Cl.
*G06F 3/038* (2006.01)

(52) U.S. Cl. ........................ 345/204; 345/98; 345/100

(58) Field of Classification Search .................. 345/87, 345/89, 98-100, 204
See application file for complete search history.

(56) References Cited

U.S. PATENT DOCUMENTS

| | | | | |
|---|---|---|---|---|
| 6,160,533 | A * | 12/2000 | Tamai et al. | 345/89 |
| 2003/0122759 | A1* | 7/2003 | Abe et al. | 345/89 |
| 2004/0012581 | A1* | 1/2004 | Kurokawa et al. | 345/204 |
| 2004/0046752 | A1* | 3/2004 | Willis et al. | 345/204 |
| 2006/0071897 | A1* | 4/2006 | Moon | 345/98 |

FOREIGN PATENT DOCUMENTS

| | | |
|---|---|---|
| JP | A-07-036405 | 2/1995 |
| JP | 07-306660 A | 11/1995 |
| JP | A-07-319427 | 12/1995 |
| JP | A-08-008727 | 1/1996 |
| JP | A-08-095530 | 4/1996 |
| JP | A-08-095531 | 4/1996 |
| JP | A-2001-306021 | 11/2001 |
| JP | A-2003-044015 | 2/2003 |

* cited by examiner

*Primary Examiner*—Richard Hjerpe
*Assistant Examiner*—Kimnhung Nguyen
(74) *Attorney, Agent, or Firm*—Oliff & Berridge, PLC

(57) ABSTRACT

To reduce power consumption in an IC driver that is capable of accommodating image data in a plurality of kinds of unit bit lengths and supplies a plurality of display signals to a plurality of corresponding respective electrodes of an image display device based on image data, a semiconductor integrated circuit is equipped with a counter that counts a clock signal and outputs count values, a comparison data generation circuit that outputs a plurality of kinds of comparison data for each kind of unit bit length of image data based on the count values outputted from the counter, a comparison circuit that compares image data in a unit bit length and the comparison data that are successively outputted from the comparison data generation circuit, and a pulse output circuit that determines pulse widths of the plurality of display signals to be supplied to the plurality of corresponding respective electrodes based on a comparison result obtained by the comparison circuit and outputs the display signals.

4 Claims, 10 Drawing Sheets

FIG. 4

| COUNT VALUE | |
|---|---|
| 4096-COLOR MODE | 65K-COLOR MODE |
| 0000110010 | 0000001010 |
| 0001100100 | 0000011001 |
| ⋮ | 0000100101 |
| | 0000110010 |
| 1101000001 | ⋮ |
| | 1100111011 |
| | 1101001000 |

15 KINDS (4096-COLOR MODE)

63 KINDS (65K-COLOR MODE)

FIG. 10
(PRIOR ART)

| COUNT VALUE |
|---|
| 0000001010 |
| 0000011001 |
| 0000100101 |
| 0000110010 |
| ⋮ |
| 1100111011 |
| 1101001000 |

63 KINDS

SEMICONDUCTOR INTEGRATED CIRCUIT

BACKGROUND OF THE INVENTION

1. Field of Invention

The present invention relates to semiconductor integrated circuits (driver ICs) that drive display devices, such as LCDs (liquid crystal displays; liquid crystal panels), and more particularly to semiconductor integrated circuits that drive display devices using a PWM (pulse width modulation) method.

2. Description of Related Art

Liquid crystal panels are widely used in display sections of small related art devices, such as wrist watches, portable telephones and the like. Color tone (hue and lightness) of an image displayed on a liquid crystal panel is determined by lightness of each color displayed based on each of image data of R (red), G (green) and B (blue).

For example, when 16-bit image data is used, generally, 5 bits are allocated to R (red), 6 bits to G (green), and 5 bits to B (blue). Accordingly, for G (green), lightness in $2^6=64$ gradations can be displayed, and color tone in $2^{16}$=about 65 k colors in total can be expressed. It is noted that image data of R (red) and B (blue) are used through changing their unit bit length from 5 bits to 6 bits, as the same circuit is shared.

Also, when 12-bit image data is used, the unit bit length of image data in each color is 4 bits, such that, for each color, lightness in $2^4=16$ gradations can be displayed, and color tone in $2^{12}=4096$ colors in total can be expressed. When the unit bit length of image data of each color is either 4 bits or 6 bits, and both of the image data are to be accommodated, the unit bit length of 4 bits is converted to 6 bits.

Display signals that are to be supplied to a liquid crystal panel may be generated using a PWM method in order to determine lightness of each color. For example, display with lightness in 64 gradations is performed through comparing image data having a unit bit length of 6 bits and data each having 6 bits which are counted up and outputted at a predetermined timing, making pixels of the liquid crystal panel to emit light until the two coincide with each other, and prohibiting the pixels of the liquid crystal panel from emitting light after the two coincide with each other.

FIG. 9 shows a part of the structure of a related art driver IC. As indicated in FIG. 9, the driver IC includes an image data conversion table 100 that converts the unit bit length of image data of each color in 4 bits or 5 bits into 6 bits, a RAM (random access memory) 101 that stores image data, a counter 102 that counts a clock signal inputted and outputs count values, a comparison data generation circuit 103 that outputs data corresponding to predetermined count values, and a coincidence detection circuit 104 that compares the image data outputted from the RAM 101 and comparison data that are successively outputted from the comparison data generation circuit 103 to detect coincidence thereof.

FIG. 10 is a schematic indicating count values that the comparison data generation circuit shown in FIG. 9 stores. The comparison data generation circuit 103 stores 63 kinds of count values indicated in FIG. 10. It is noted here that the comparison data generation circuit 103 outputs comparison data ranging from “000000” to “111111” while successively incrementing its value by 1 when inputted count values coincide with the count values stored. For example, the comparison data generation circuit 103 changes comparison data sixty three times in total, to generate one display signal, starting from an output of comparison data “000001” at the time of an input of a count value “0000001010” until an output of comparison data “111111” at the time of an input of a count value “1101001000.”

SUMMARY OF THE INVENTION

Referring back to FIG. 9, the coincidence detection circuit 104 compares 6-bit image data outputted from the RAM 101 and each of the comparison data “000000”-“11111” successively outputted from the comparison data generation circuit 103 to detect coincidence thereof. Also, when the unit bit length of image data of each color is 4 bits, the comparison data generation circuit 103 also changes comparison data sixty three times in total to generate each one display signal, which is problematical because this causes wasteful power consumption.

As a related technology, Japanese Laid-open Patent Application HEI 7-306660 (Pages 4-5, FIG. 5) describes a gradation driving circuit for a low cost liquid crystal display device that is capable of performing multiple gradation display of $2^n$ levels and reducing the number of external power input lines and analog switches. The gradation driving circuit detects coincidence between gradation data and data outputted from a clock counter by using an AND circuit and a plurality of EXNOR circuits, and modulates the pulse width based on an output signal indicating the coincidence.

However, when images in different numbers of colors, such as 65 k colors and 4096 colors are to be displayed by using the aforementioned gradation driving circuit (driver IC), even when image data in 4096 colors (4 bits in each color) is displayed, image data of each pixel needs to be compared with sixty four 6-bit data that are outputted at a predetermined timing.

In view of the above, the present invention reduces the power consumption of a semiconductor integrated circuit (driver IC) that can handle image data in multiple kinds of unit bit lengths, and supplies a plurality of display signals to a plurality of corresponding respective electrodes of an image display device based on the image data.

To address the aforementioned problems, a semiconductor integrated circuit in accordance with an aspect of the present invention includes: a counter that counts a clock signal and outputs count values; a comparison data generation circuit that outputs a plurality of kinds of comparison data for each of a plurality of kinds of unit bit lengths of image data based on the count values outputted from the counter; a comparison circuit that compares image data in a unit bit length and the comparison data that are successively outputted from the comparison data generation circuit; and a pulse output circuit that determines pulse widths of the plurality of display signals to be supplied to the plurality of corresponding respective electrodes based on a comparison result obtained by the comparison circuit and outputs the display signals.

Here, the comparison data generation circuit may output comparison data having a bit length that is identical with the maximum unit bit length of the image data. In this instance, image data other than the image data having the maximum unit bit length may be changed to have the maximum unit bit length by inserting a fixed value in a lower level bit side of the image data, such that the comparison condition is always satisfied for a portion of the fixed value of the image data in the comparison circuit. Alternatively, for image data other than the image data having the maximum unit bit length, a fixed value may be inserted in a lower level bit side of the comparison data having the unit bit length of the image data, such that the comparison condition is always satisfied for a portion of the fixed value of the comparison data in the comparison circuit.

The comparison circuit may include: a first group of transistors being serially connected to one another and having gates that receive inputs of parallel signals representing a plurality of bits of image data; and a second group of transistors that are connected in parallel with the first group of transistors, the second group of transistors being serially connected to one another and having gates that receive inputs of parallel signals representing a plurality of bits of comparison data, wherein the transistors are turned on when the fixed value of the image data or the comparison data is inputted in the gates thereof.

In accordance with an aspect of the present invention, due to the fact that the comparison data generation circuit outputs comparison data in a plurality of kinds for each kind of unit bit length of image data, the power consumption can be reduced through performing coincidence detection that fits to the unit bit length of image data.

BRIEF DESCRIPTION OF THE DRAWINGS

FIG. 4 is a schematic indicating count values stored in a comparison data generation circuit shown in FIG. 3;

FIG. 10 is a schematic indicating count values stored in a comparison data generation circuit shown in FIG. 9.

DETAILED DESCRIPTION OF EXEMPLARY EMBODIMENTS

Exemplary embodiments of the present invention will be described below with reference to the accompanying drawings. It is noted that the same components have the same reference numbers, and their description is duplicated.

Figure 1:
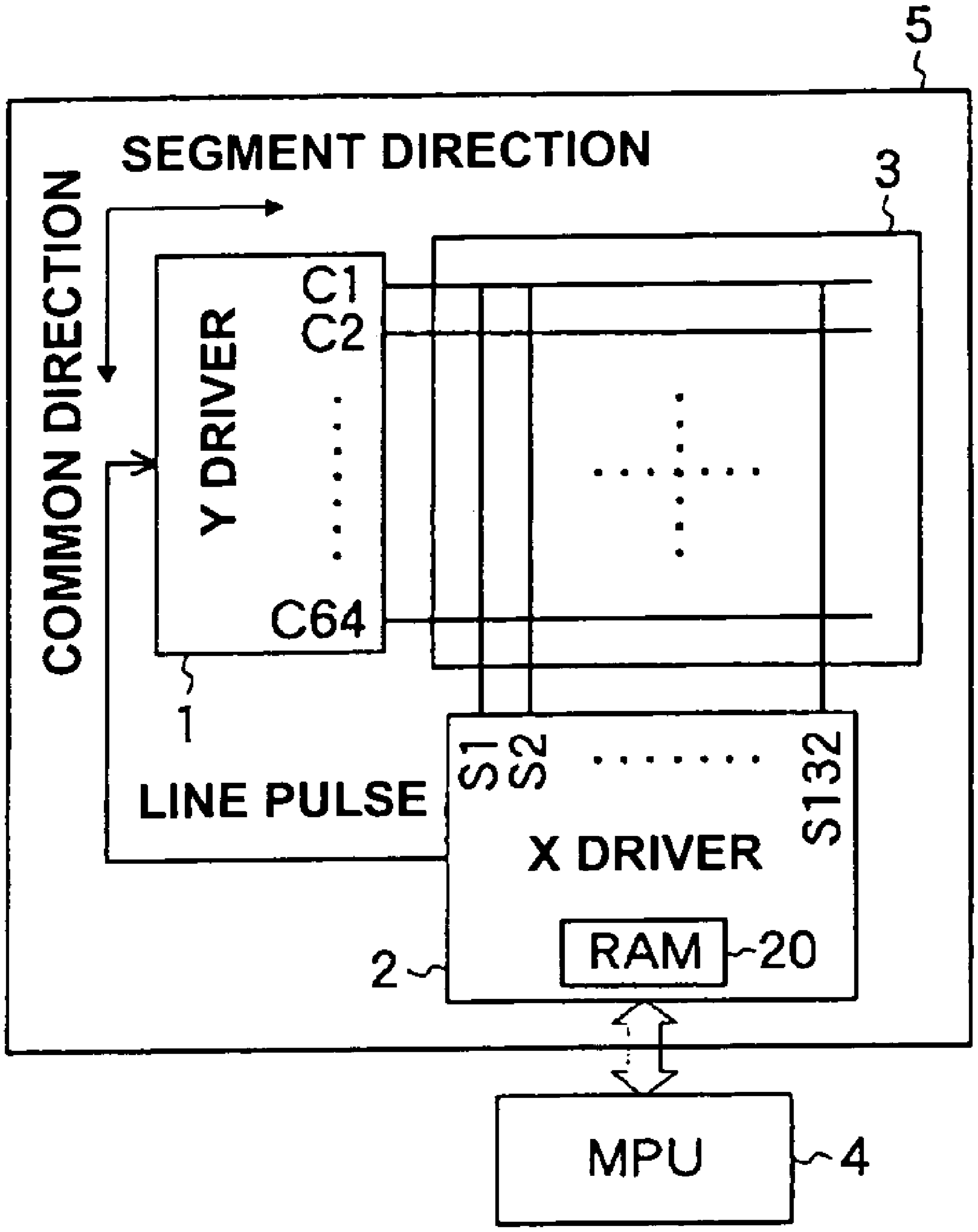
FIG. 1 is a schematic of an image display device using a semiconductor integrated circuit in accordance with an exemplary embodiment of the present invention.

FIG. 1 shows the structure of an image display device that uses a semiconductor integrated circuit in accordance with an exemplary embodiment of the present invention. As the present exemplary embodiment, a liquid crystal display device is described as an example. It is noted that, in the present application, a substrate means a transparent dielectric substrate, a printed substrate, a flexible substrate or the like, on which a liquid crystal panel and a driver IC can be mounted and electrically wired, and in the present exemplary embodiment, a glass substrate is used.

As indicated in FIG. 1, the image display device includes a substrate 5, driver ICs 1 and 2 mounted on the substrate 5, and a liquid crystal panel 3. The driver IC (Y driver) 1 outputs scanning signals to drive the liquid crystal panel 3, in synchronism with line pulses. The driver IC (X driver) 2 has a built-in RAM 20 that stores image data indicative of image information to be displayed on the liquid crystal panel 3, and outputs display signals to drive the liquid crystal panel 3 and supplies the line pulses to the Y driver 1. Here, the X driver 2 is connected to a MPU 4. Image data outputted from the MPU 4, addresses that are used to designate storage regions for the image data in the RAM 20, and a variety of control signals are inputted in the X driver 2.

The liquid crystal panel 3 includes a plurality of regions in a segment direction, and a plurality of regions also in a common direction. Here, by designating one of the regions in the segment direction and one of the regions in the common direction, one pixel (dot) is specified. In the case of a color image display device, three dots in R, G and B (red, green and blue) are used to express image information of each dot. For example, the liquid crystal panel 3 may include 132 regions (44 regions for each of RGB) in the segment direction, and 64 regions in the common direction. In this case, the liquid crystal panel 3 has 132×64 pixels.

To apply voltage to these regions, a plurality of signal electrodes in the segment direction and a plurality of scanning electrodes in the common direction are arranged in the liquid crystal panel 3. The signal electrodes are connected to a plurality of output terminals provided on the X driver 2, respectively, and the scanning electrodes are connected to a plurality of output terminals provided on the Y driver 1, respectively.

The X driver 2 generates, based on the image data stored in the RAM 20, display signals S1-S132 to be supplied to the plurality of signal electrodes arranged in the segment direction of the liquid crystal panel 3. Here, the display signals S $(3i+1)$ are display signals according to image data of R (red), the display signals S $(3i+2)$ are display signals according to image data of G (green), and the display signals S $(3i+3)$ are display signals according to image data of B (blue), where $i=0, 1, 2, \ldots, 43$.

Also, the Y driver 1 generates scanning signals C1-C64 for scanning the liquid crystal panel 3 according to the line pulses supplied from the X driver 2, and supplies the same to the plurality of scanning electrodes arranged in the common direction of the liquid crystal panel 3, respectively.

Figure 2:
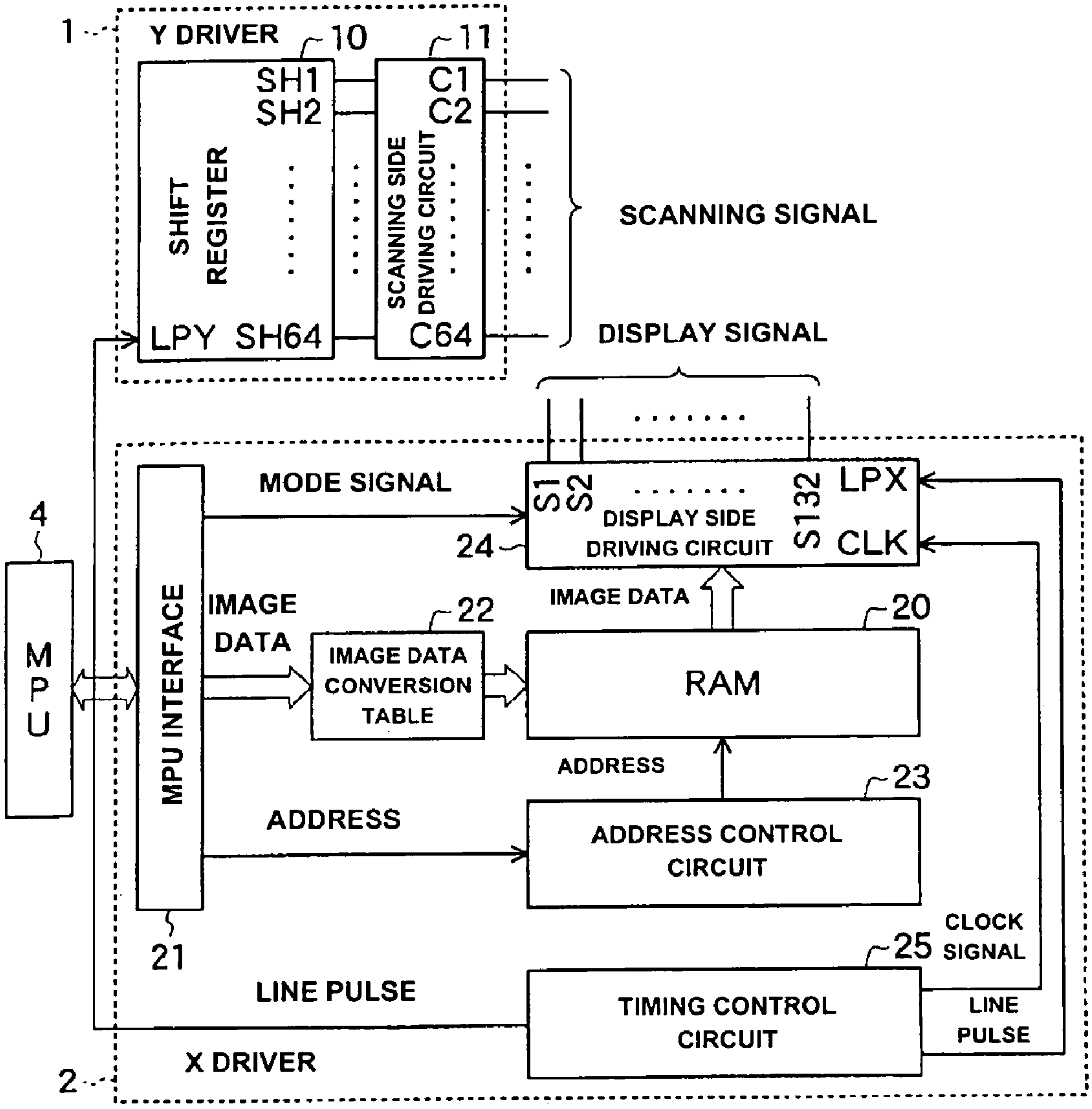
FIG. 2 is a schematic of the structure of a semiconductor integrated circuit in accordance with an exemplary embodiment of the present invention.

FIG. 2 shows the structure of a semiconductor integrated circuit in accordance with an exemplary embodiment of the present invention. As indicated in FIG. 2, the X driver 2 includes an MPU interface 21 to connect to the MPU 4, an image data conversion table 22 that converts the unit bit length of image data of each color from 4 bits or 5 bits into 6 bits, the RAM 20 that stores image data inputted from the MPU 4, an address control circuit 23 that designates storage regions (addresses) for image data in the RAM 20 and controls writing and reading of the image data, a display side driving circuit 24 that generates the display signals S1-S132 based on image data read out from the RAM 20, and a timing control circuit 25 that controls output timings of the display signals and the scanning signals.

Storage regions of image data in the RAM 20 are designated by the address control circuit 23 based on addresses input from the MPU 4. Also, image data to be read out from the RAM 20 are also designated by the address control circuit 23. The display side driving circuit 24 generates the display signals S1-S132 and outputs the same to the signal electrodes, based on image data inputted from the RAM 20 and clock signals and line pulses inputted from the timing control circuit 25.

The timing control circuit 25 controls the output timing of display signals at the display side driving circuit 24, and supplies to the Y driver 1 line pulses that specify the timing of line scanning so as to control the output timing of scanning signals at the Y driver 1.

The Y driver 1 includes a shift register 10 and a scanning side driving circuit 11. The shift register 10 successively outputs shift signals SH1-SH64 in synchronism with the line pulses. The scanning side driving circuit 11 successively generates scanning signals C1-C64 and outputs the same to the scanning electrodes, based on the shift signals SH1-SH62 outputted from the shift register 10.

Figure 3:
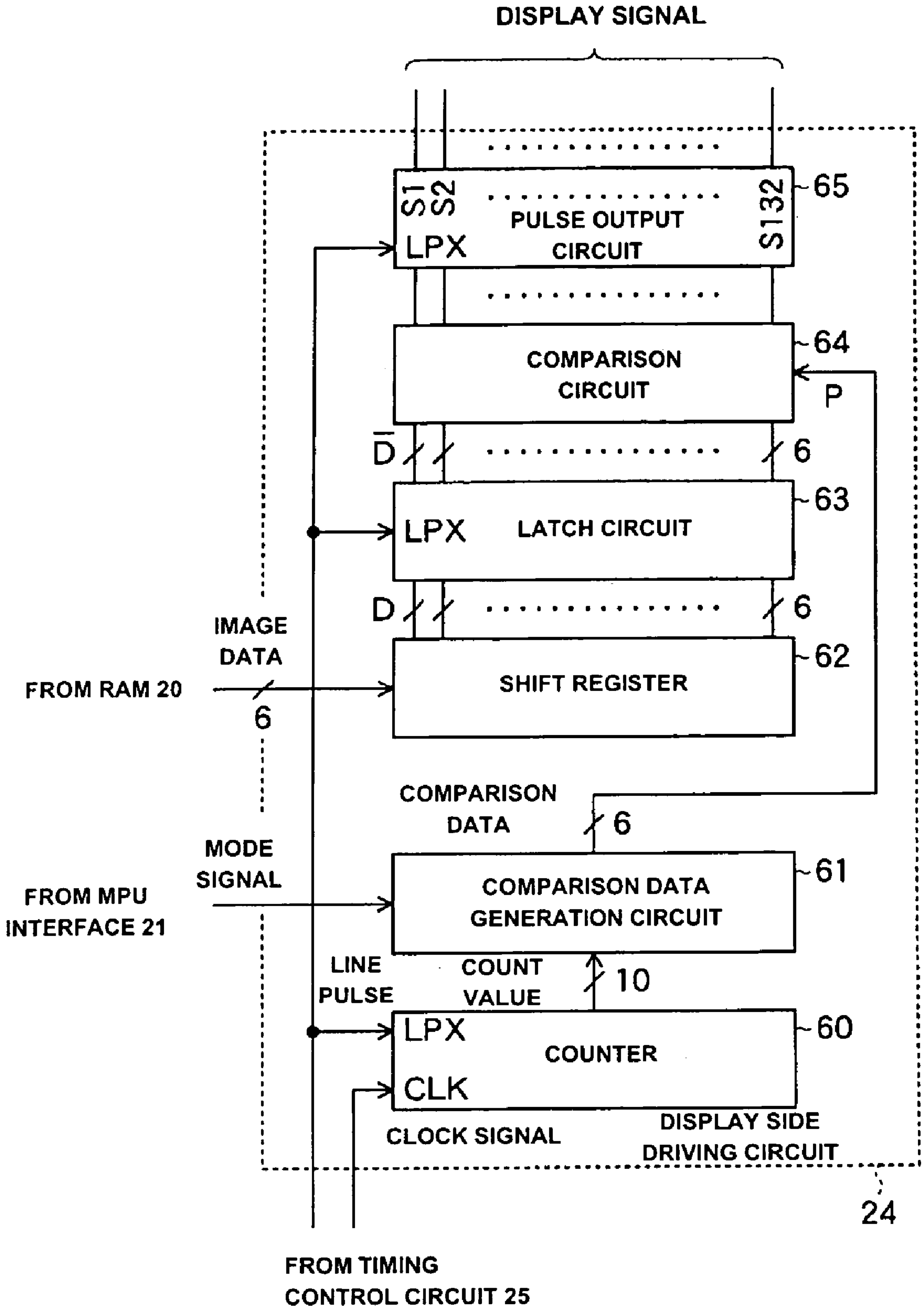
FIG. 3 is a schematic of the detailed structure of a display side driving circuit shown in FIG. 2.

FIG. 3 shows in detail the structure of the display side driving circuit shown in FIG. 2. As shown in FIG. 3, the display side driving circuit 24 includes a counter 60 that counts the clock signal and outputs count values, and a comparison data generation circuit 61 that outputs, when predetermined count values are inputted from the counter 60, comparison data corresponding to the count values. The counter 60 is reset by a line pulse.

A mode signal, which is input from the MPU through the MPU interface 21 to the comparison data generation circuit 61, is a signal indicating whether display in 65 k colors, according to 16-bit image data, is to be performed or whether display in 4096 colors, according to 12-bit image data, is to be performed. In either of the cases, image data outputted from the MPU interface 21 is converted to image data having a unit bit length of 6 bits.

The comparison data generation circuit 61 is a circuit that outputs comparison data to be compared with image data in a unit bit length corresponding to the count values, and stores a plurality of kinds of count values for each of the kinds of unit bit lengths of image data. The comparison data generation circuit 61 is supplied with the mode signal, and outputs, when predetermined count values are inputted from the counter 60, comparison data corresponding to the count values according to the mode.

FIG. 4 is a schematic indicating count values that the comparison data generation circuit shown in FIG. 3 stores. As indicated in FIG. 4, the comparison data generation circuit 61 stores 15 kinds of count values in the 4096-color mode, and 63 kinds of count values in the 65 k-color mode.

When inputted count values are equal to the stored count values, the comparison data generation circuit 61 outputs comparison data while incrementing its value by "000100" in the 4096-color mode, and outputs comparison data while incrementing its value by "000001" in the 65 k-color mode. For example, in the 4096-color mode, the comparison data generation circuit 61 outputs comparison data "000111" when a count value "0000110010" is inputted, and outputs comparison data "001011" when a count value "0001100100" is inputted. Also, in the 65 k-color mode, the comparison data generation circuit 61 outputs comparison data "000001" when a count value "0000001010" is inputted, and outputs comparison data "000010" when a count value "0000011001" is inputted.

Figure 5:
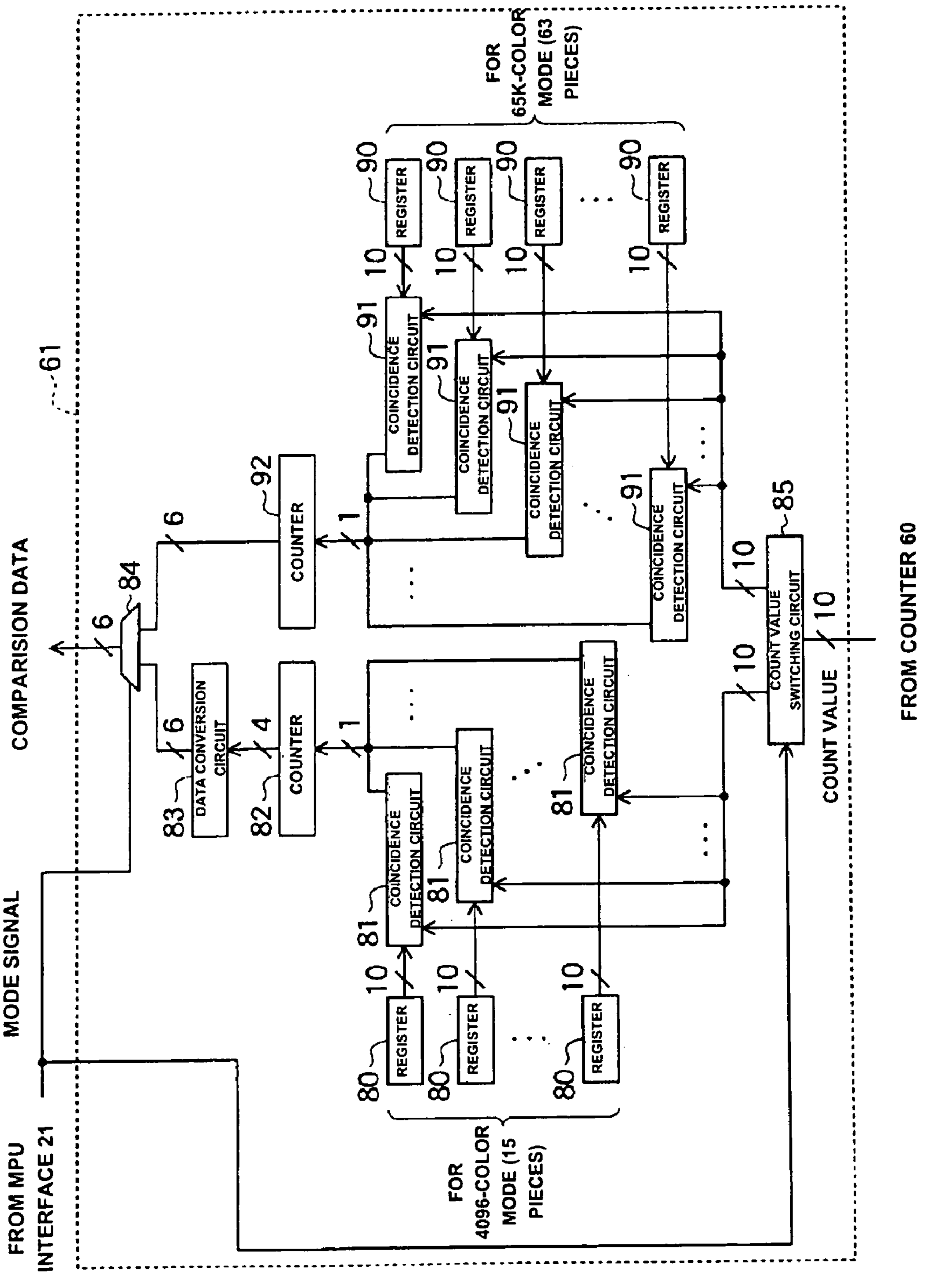
FIG. 5 is a schematic of the structure of comparison data generation circuit shown in FIG. 3.

Next, the structure of the comparison data generation circuit 61 will be described. FIG. 5 shows the structure of the comparison data generation circuit shown in FIG. 3. As shown in FIG. 5, the comparison data generation circuit 61 includes fifteen registers 80 for the 4096-color mode, fifteen coincidence detection circuits 81 for the 4096-color mode, a counter 82 with 4-bit output, and a data conversion circuit 83 that converts 4-bit count values outputted from the counter 82 into 6-bit values.

Each of the registers 80 stores the count values in the 4096-color mode indicated in FIG. 4. The coincidence detection circuit 81 compares the count values stored in the register 80 with each count value outputted from the counter 60, and outputs one pulse when they coincide. Here, outputs of the plurality of coincidence detection circuits 81 are wired-OR connected. The counter 82 counts pulses outputted from any one of the coincidence detection circuits 81, and outputs 4-bit count values. A data conversion circuit 82 adds "11" to the least significant bit of a count value outputted from the counter 82 to thereby convert the count value to 6-bit data, and outputs the same as comparison data. Accordingly, as the comparison data in the 4096-color mode, comparison data "000011" through "111111" which are gradually incremented by "100" as the count values become larger are outputted.

Also, the comparison data generation circuit 61 includes sixty-three registers 90 for the 65 k-color mode, sixty-three coincidence detection circuits 91 for the 65 k-color mode, and a counter 92 with 6-bit output.

Each of the registers 90 stores the count values in the 65 k-color mode indicated in FIG. 4. The coincidence detection circuit 91 compares the count values stored in the register 90 with each count value outputted from the counter 60, and outputs one pulse when they coincide. Here, outputs of the plurality of coincidence detection circuits 81 are wired-OR connected. The counter 92 counts pulses outputted from any one of the coincidence detection circuits 91, and outputs 6-bit count values as comparison data. Accordingly, as the comparison data in the 65 k-color mode, comparison data "000000" through "111111" which are incremented by "1" at a time as the count values become larger are outputted.

Further, the comparison data generation circuit 61 includes a selector 84 and a count value switching circuit 85. The selector 84 selects, based on a mode signal, comparison data outputted from the data conversion circuit 83 when the 4096-color display with 12-bit image data is performed, and selects comparison data outputted from the counter 92 when the 65 k-color display with 16-bit image data is performed.

The count value switching circuit 85 includes ten AND circuits that receive inputs of a mode signal and 10-bit count values and generate signals to be outputted to the respective coincidence detection circuits 81 based on these signals, as well as ten AND circuits that receive inputs of an inverted mode signal and 10-bit count values and generate signals to be outputted to the respective coincidence detection circuits 91 based on these signals.

The count value switching circuit 85, when performing the 4096-color display with 12-bit image data based on the mode signal, outputs count values outputted from the counter 60 to the coincidence detection circuits 81, and outputs data "0000000000" to the coincidence detection circuits 91. On the other hand, the count value switching circuit 85, when performing the 65 k-color display with 16-bit image data, outputs count values outputted from the counter 60 to the coincidence detection circuits 91, and outputs data "0000000000" to the coincidence detection circuits 81.

Referring back to FIG. 3, the X driver 2 includes a shift register 62 that shifts image data supplied from the RAM 20 and outputs the same, and a latch circuit 63 that retains image data D inputted from the shift register 62 in synchronism with line pulses.

Further, the X driver 2 includes a comparison circuit 64 that compares inverted image data D bar outputted from the latch circuit 63 and comparison data P that are successively outputted from the comparison data generation circuit 61, and a pulse output circuit 65 that outputs display signals S1-S132 based on the comparison result of the comparison circuit 64 and the line pulses. It is noted here that the comparison circuit 64 outputs a low level signal when the comparison data P that is successively changed to a greater value comes to have an inverted relation with respect to the inverted imaged data D bar (when the comparison data P coincides with the image data D).

Figure 6:
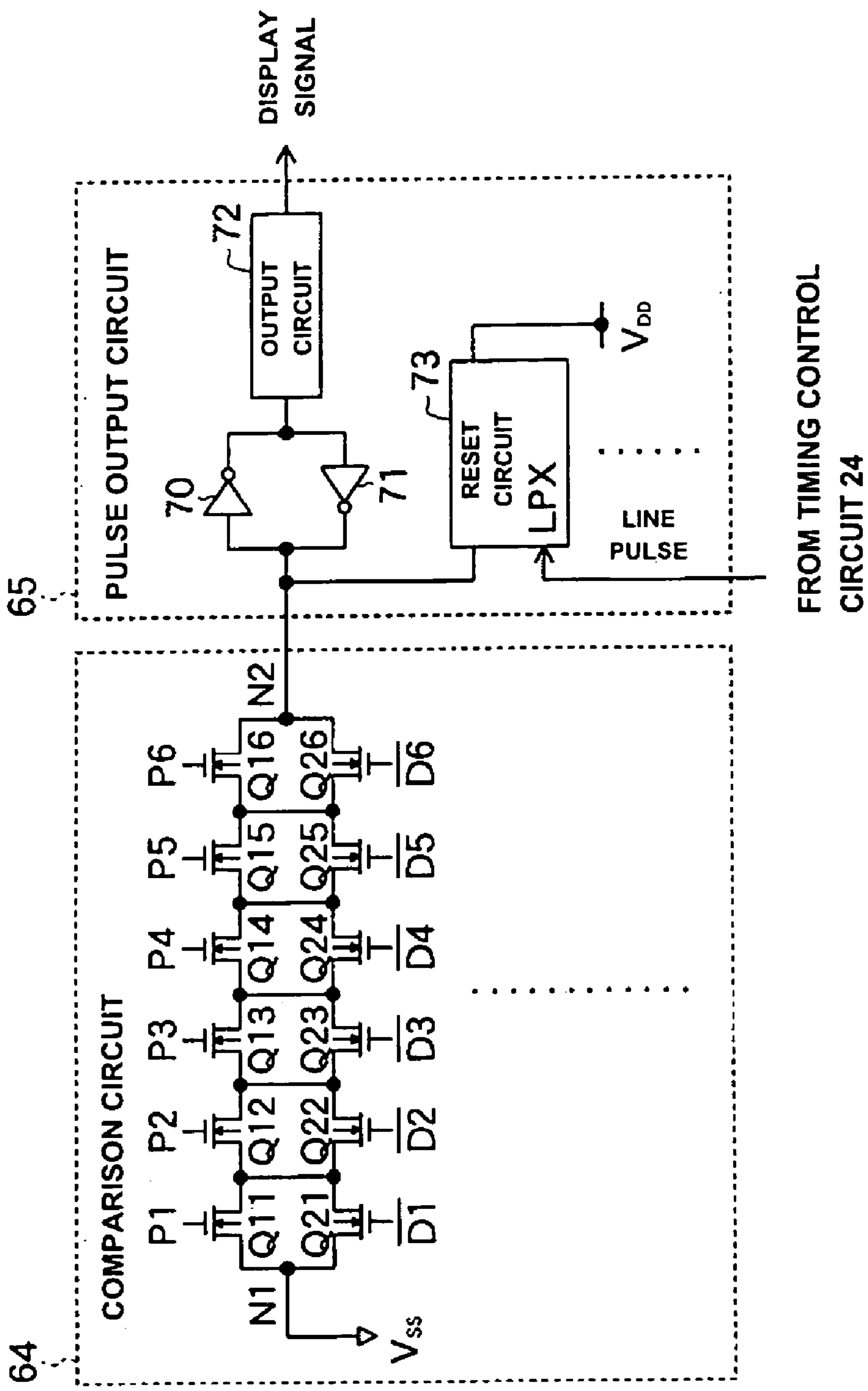
FIG. 6 is a schematic of the structures of a comparison circuit and a pulse output circuit for each one signal electrode.

FIG. 6 shows the structure of the comparison circuit and the pulse output circuit for each one of the signal electrodes. As shown in FIG. 6, the comparison circuit 64 is formed from N-channel MOS transistors Q11-Q16 and Q21-Q26. Here, the transistors Q11-Q16 are serially connected, and the transistors Q21-Q26 are also serially connected. Further, the transistors Q1-Q16 are connected in parallel to the transistors Q21-Q26, respectively.

A node N1 at a connecting point of a source of the transistor Q11 and a source of the transistor Q21 is connected to a power supply voltage $V_{SS}$. Also, a node N2 at the connecting point of a drain of the transistor Q16 and a drain of the transistor Q26 is connected to the pulse output circuit 65.

The comparison circuit 64 outputs a low-level signal by conductively connecting between the node N1 and the node N2, when the first bit (LSB) P1 of the comparison data or the first bit (LSB) D1 of the inverted image data is at high level, the second bit P2 of the comparison data or the second bit D2 of the inverted image data is at high level, . . . , and the sixth bit (MSB) P6 of the comparison data or the sixth bit (MSB) D6 of the inverted image data is at high level.

The pulse output circuit 65 includes two inverters 70 and 71 to retain the level of the signal inputted, an output circuit 72 that outputs a display signal based on an output value of the inverter 70, and a reset circuit 73 that resets the states of the inverters 70 and 71 in synchronism with line pulses.

Figure 7:
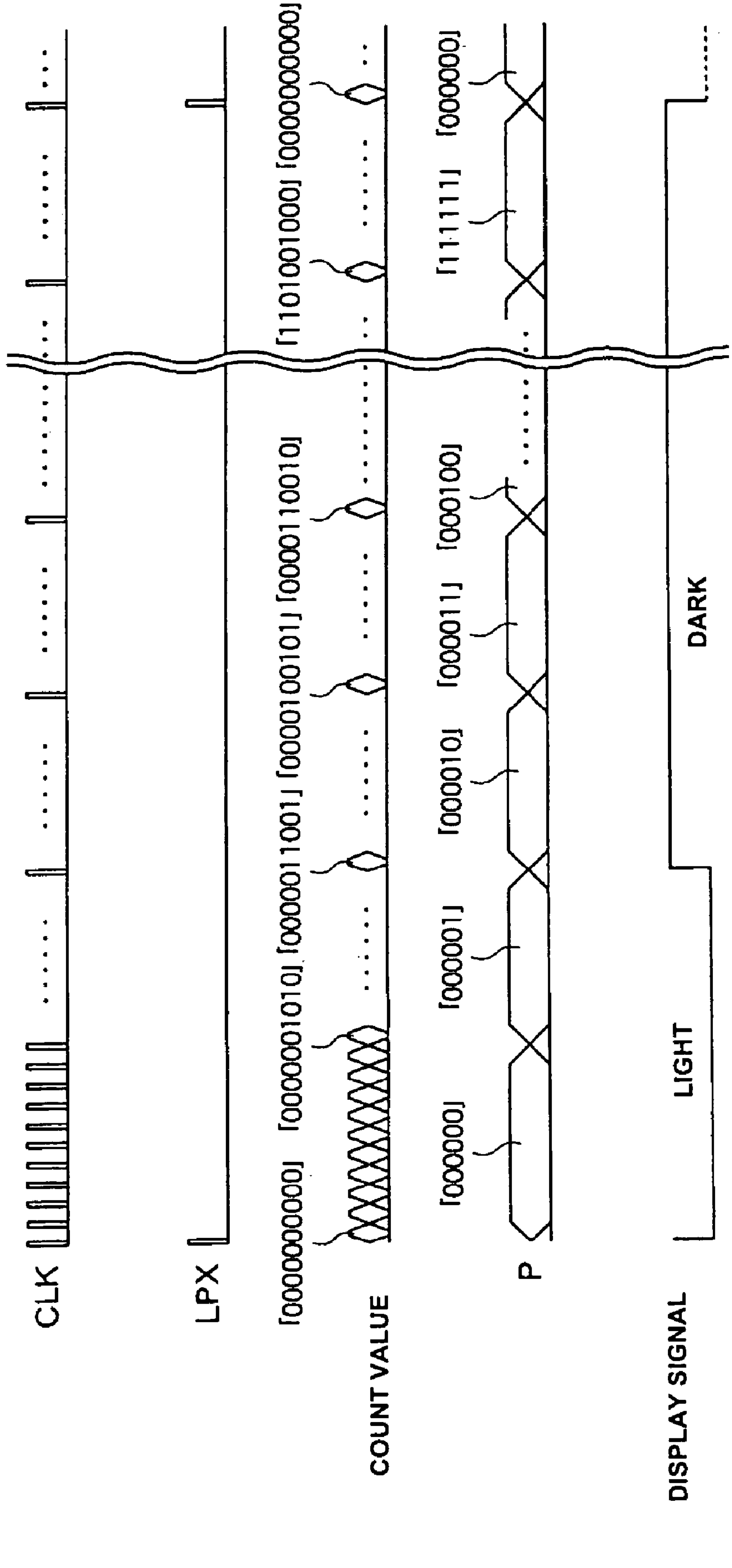
FIG. 7 is a schematic for describing operations in the 65 k-color mode.

Next, operations of the semiconductor integrated circuit in accordance with an exemplary embodiment of the present invention will be described. First, referring to FIG. 3 through FIG. 7, operations in the 65 k-color mode will be described. FIG. 7 is a timing chart for describing operations in the 65 k-color mode of the semiconductor integrated circuit in accordance with the present exemplary embodiment. It is assumed here that image data D is "000010" and inverted image data D bar is "111101."

As indicated in FIG. 7, when, in synchronism with a line pulse LPX, the counter 60 is reset, and the reset circuit 73 outputs a high-level signal to the input of the inverter 70 to reset the state thereof, the pulse output circuit 65 outputs a low-level display signal such that a corresponding pixel of the liquid crystal panel lights up.

Next, as the counter 60 starts counting a clock signal CLK, counts the tenth pulse included in the clock signal CLK, and outputs a count value "0000001010," the comparison data generation circuit 61 outputs to the comparison circuit 64 comparison data "000001" that corresponds to the count value "0000001010" in the 65 k-color mode.

The comparison circuit 64 turns on the transistor Q11 and turns off the transistors Q12-Q16 based on the comparison data "000001" outputted from the comparison data generation circuit 61. In the meantime, the comparison circuit 64 turns on the transistors Q21 and Q23-Q26 and turns off the transistor Q22 based on the inverted image data "111101." Accordingly, the node N1 and the node N2 are not conductively connected such that the pulse output circuit 65 continues outputting a low-level display signal.

Next, as the counter 60 counts the $25^{th}$ pulse included in the clock signal CLK, and outputs a count value "0000011001," the comparison data generation circuit 61 outputs to the comparison circuit 64 comparison data "000010" that corresponds to the count value "0000011001" in the 65 k-color mode.

The comparison circuit 64 turns on the transistor Q12 and turns off the transistors Q11 and Q13-Q16 based on the comparison data "000010" outputted from the comparison data generation circuit 61. In the meantime, the comparison circuit 64 turns on the transistors Q21 and Q23-Q26 and turns off the transistor Q22 based on the inverted image data "111101." Accordingly, the node N1 and the node N2 become conductively connected such that the pulse output circuit 65 changes the display signal to a high level, and a corresponding pixel of the liquid crystal panel darkens.

In this manner, as the count value increases, the value of comparison data is incremented according to the count value. Accordingly, at the timing when the node N1 and the node N2 in the comparison circuit 64 initially become conductively connected, the display signal is shifted to a high level. Thereafter, the state of the display signal is maintained by the inverters 70 and 71 even when the nodes N1 and N2 are not conductively connected. As a result, at the timing when comparison data coincides with image data, a pulse width of a display signal that is used for illuminating each color is determined, and the lightness of a corresponding pixel in the liquid crystal panel is determined.

Figure 8:
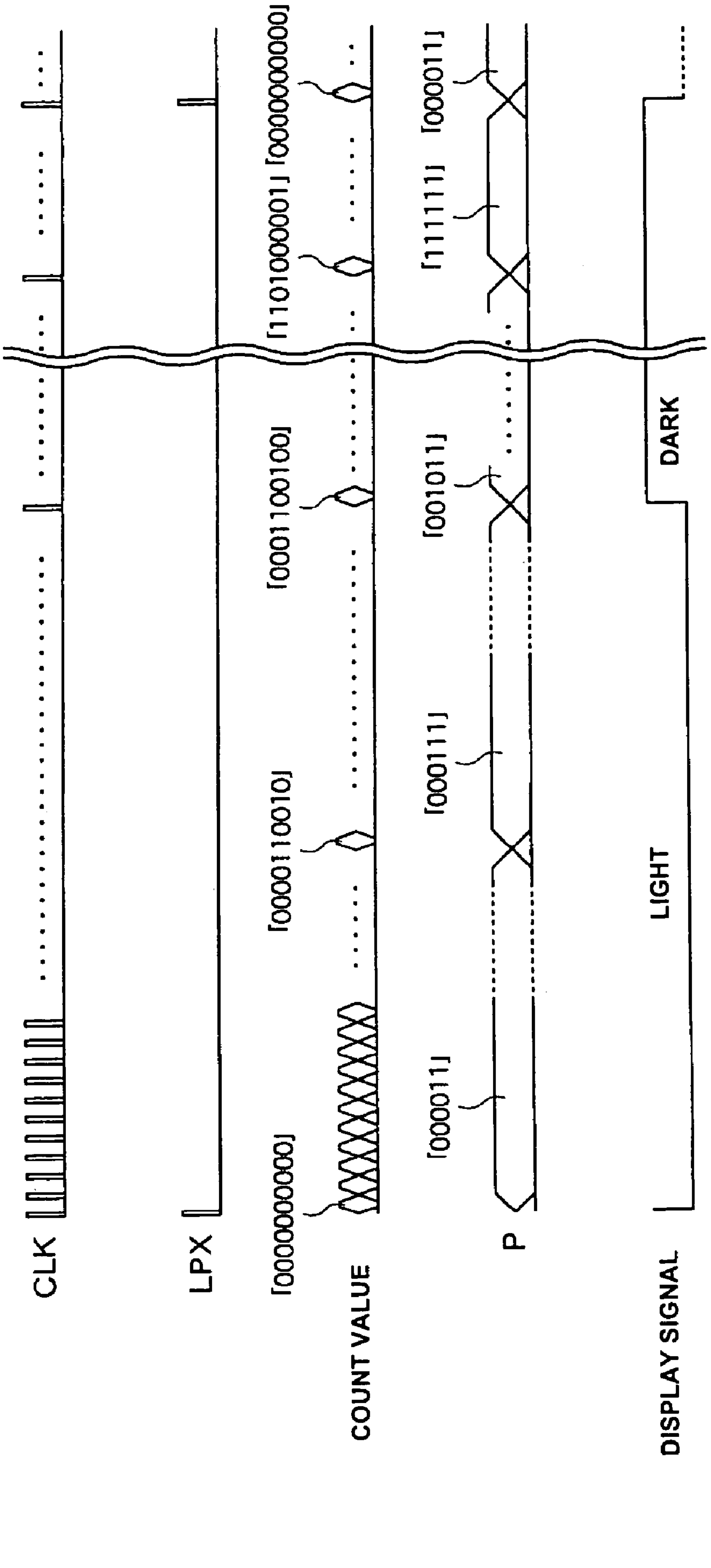
FIG. 8 is a schematic for describing operations in the 4096-color mode.
Figure 9:
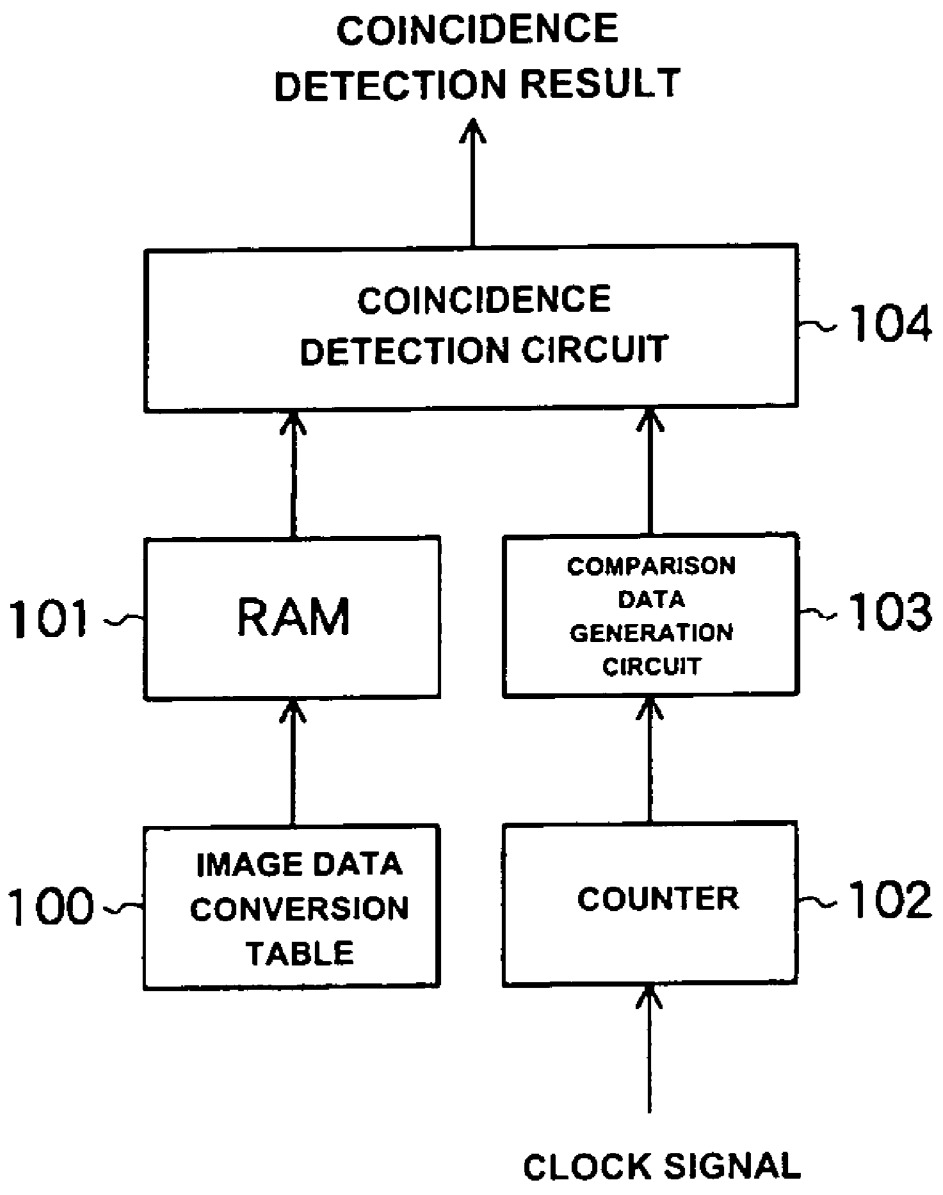
FIG. 9 (PRIOR ART)
FIG. 9 is a schematic of a part of the structure of conventional driver IC.

Next, referring to FIG. 3 through FIG. 6 and FIG. 8, the case in the 4096-color mode will be described. FIG. 8 is a timing chart for describing operations in the 65 k-color mode of the semiconductor integrated circuit in accordance with the present exemplary embodiment. It is noted here that image data D is "0010" and inverted image data D bar is "1101." When image data is in 4 bits, these bits are used as upper level four bits D6-D3, and a fixed value is inserted as lower level two bits D2 and D1. Here, when the fixed value is "00," the comparison condition can be always satisfied for the lower level two bits without regard to values of the lower level two bits P2 and P1 of comparison data.

As shown in FIG. 8, as the counter 60 is reset in synchronism with a line pulse LPX, and the reset circuit 73 outputs a high-level signal to the input of the inverter 70 to reset the status thereof, the pulse output circuit 65 outputs a low-level display signal such that a corresponding pixel of the liquid crystal panel lights up.

Next, as the counter 60 starts counting a clock signal CLK, counts the fiftieth pulse included in the clock signal CLK, and outputs a count value "0000110010," the comparison data generation circuit 61 outputs to the comparison circuit 64 comparison data "000111" that corresponds to the count value "0000110010" in the 4096-color mode.

The comparison circuit 64 turns on the transistors Q11-Q13 and turns off the transistors Q14-Q16 based on the comparison data "000111" outputted from the comparison data generation circuit 61. In the meantime, the comparison circuit 64 turns on the transistors Q23 and Q25-Q26 and turns off the transistor Q24 based on the inverted image data "1101." Accordingly, the node N1 and the node N2 do not become conductively connected such that the pulse output circuit 65 continues outputting the low-level display signal.

Next, as the counter 60 starts counting the clock signal CLK, counts the one hundredth pulse included in the clock signal CLK, and outputs a count value "0001100100," the comparison data generation circuit 61 outputs to the comparison circuit 64 comparison data "001011" that corresponds to the count value "0001100100" in the 4096-color mode.

The comparison circuit 64 turns on the transistors Q11-Q12 and Q14 and turns off the transistors Q13 and Q15-Q16 based on the comparison data "001011" outputted from the comparison data generation circuit 61. In the meantime, the comparison circuit 64 turns on the transistors Q23 and Q25-Q26 and turns off the transistor Q24 based on the inverted image data "1101." Accordingly, the node N1 and the node N2 become conductively connected such that the pulse output circuit 65 changes the display signal to a high level, and a corresponding pixel of the liquid crystal panel becomes dark.

In the present exemplary embodiment, when the unit bit length of image data of each color is 4 bits, a fixed value of two bits "00" may be inserted on the lower level bit side of the image data, or as described above, a fixed value of two bits "11" may be inserted on the lower level bit side of the comparison data in the comparison data generation circuit 61. In either of the cases, compared to the case of comparing 6-bit values, the number of changes of PI signal is reduced to 15/63, such that the power consumption associated with the changes of the PI signal can be reduced.

What is claimed is:

1. A semiconductor integrated circuit that accommodates image data in a plurality of kinds of unit bit lengths and supplies a plurality of display signals to a plurality of corresponding respective electrodes of an image display device based on image data, the semiconductor integrated circuit, comprising:

a counter that counts a clock signal and outputs count values;

a comparison data generation circuit that outputs a plurality of kinds of comparison data for each of the plurality of kinds of unit bit lengths of image data based on the count values outputted from the counter;

a comparison circuit that compares image data in a unit bit length and the comparison data that are sequentially output from the comparison data generation circuit; and a pulse output circuit that determines pulse widths of the plurality of display signals to be supplied to the plurality of corresponding respective electrodes based on a comparison result obtained by the comparison circuit and outputs the display signals, the comparison data generation circuit outputting comparison data having a bit length that is identical with a maximum unit bit length of the image data.

2. The semiconductor integrated circuit according to claim 1, for image data other than the image data having the maximum unit bit length, a fixed value being inserted in a lower level bit side of the comparison data having a unit bit length of the image data, such that a comparison condition is always satisfied for a portion of the fixed value of the comparison data in the comparison circuit.

3. The semiconductor integrated circuit according to claim 1, image data other than the image data having the maximum unit bit length being changed to have the maximum unit bit length by inserting a fixed value in a lower level bit side of the image data, such that a comparison condition is always satisfied for a portion of the fixed value of the image data in the comparison circuit.

4. The semiconductor integrated circuit according to claim 3, the comparison circuit comprising:

a first group of transistors being serially connected to one another and having gates that receive inputs of parallel signals representing a plurality of bits of image data; and a second group of transistors that are connected in parallel with the first group of transistors, the second group of transistors being serially connected to one another and having gates that receive inputs of parallel signals representing a plurality of bits of comparison data, the transistors being turned on when the fixed value of the image data or of the comparison data is inputted in the gates thereof.

* * * * *